Feb. 23, 1943.   A. GULOTTA   2,312,159
ROTATING DEVICE FOR AIRCRAFT WHEELS
Filed April 12, 1940
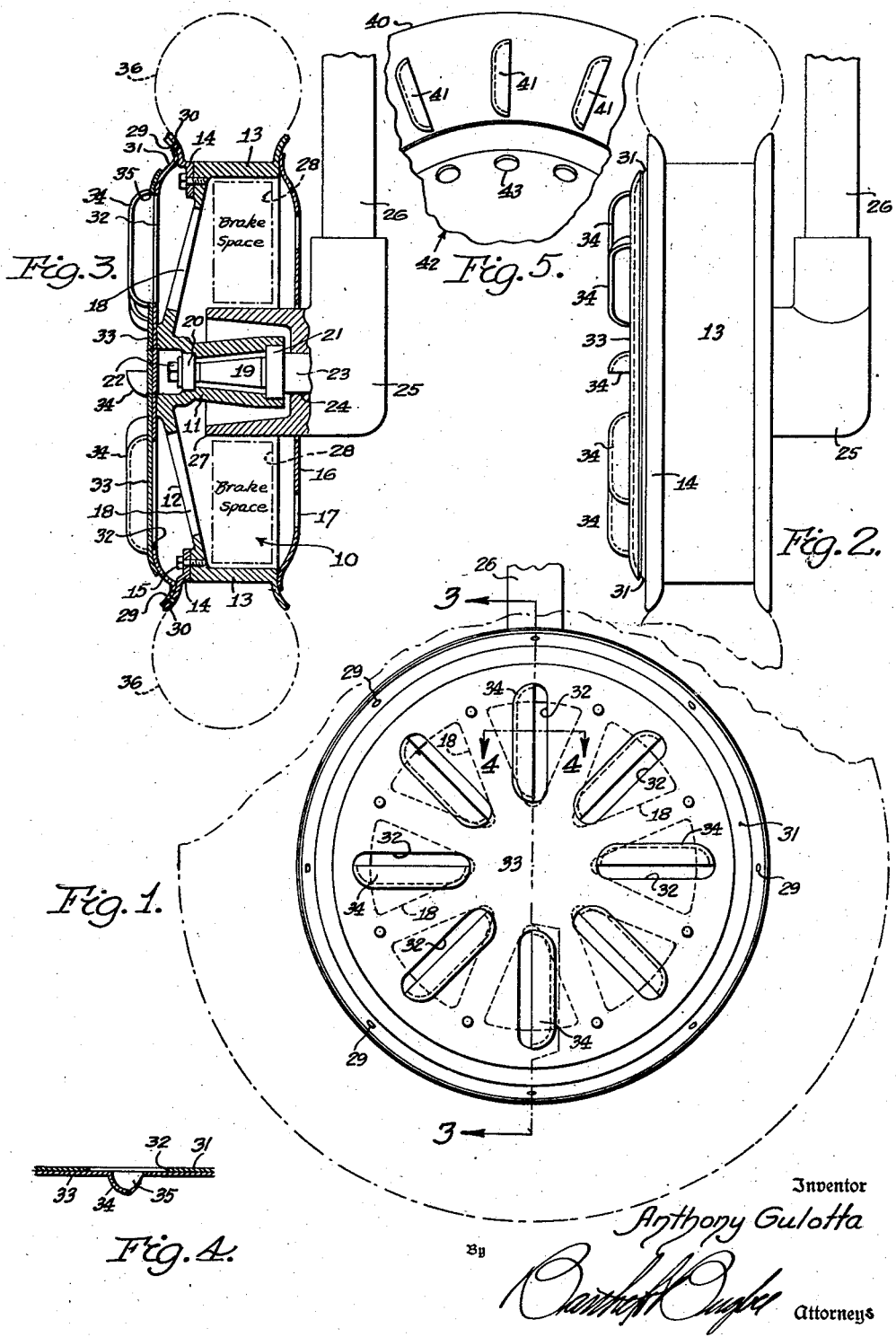
Inventor
Anthony Gulotta
By
Attorneys Patented Feb. 23, 1943

2,312,159

UNITED STATES PATENT OFFICE 2,312,159

ROTATING DEVICE FOR AIRCRAFT WHEELS

Anthony Gulotta, Dearborn, Mich.

Application April 12, 1940, Serial No. 329,293

3 Claims. (Cl. 244—103)

This invention relates to aircraft and in particular to devices used in connection with the landing gear of aircraft.

One object of the invention is to provide means for rotating the landing wheels of aircraft prior to the landing operation, so as to reduce the friction and wear ordinarily arising when such wheels are not rotating as the aircraft reaches the ground.

Another object is to provide an aircraft landing gear including means responsive to the wind for imparting a preliminary rotation of the wheels before the wheels engage the ground in landing.

Another object is to provide an aircraft landing gear including means, such as vanes, operatively connected to the wheel for imparting a preliminary rotation to the wheel so that there will be little relative motion between the periphery of the wheel and the ground when these come into engagement upon landing, thereby reducing the wear upon the tires and accordingly effecting a reduction in accidents due to blowouts of the tires arising from such causes.

Another object is to provide an aircraft wheel structure including vanes or blades adapted to be engaged by the wind so as to impart a preliminary rotation of the wheel structure before landing, these vanes or blades being secured to the wheel in the vicinity of the rim so that the vanes or blades not only rotate the wheel when acted upon by the wind but also deflect a portion of the air into the brake mechanism within the wheel, thereby providing an additional cooling action upon the brake mechanism and increasing the life and efficiency thereof.

Another object is to provide an aircraft landing wheel structure, particularly for use with retractible landing gears, including means whereby the wheel is given a preliminary rotation in response to the action of the wind encountered as soon as the wheel emerges from its compartment in the aircraft, the rotative action of the wind or air being removed when the wheel is again retracted into its compartment.

Another object is to provide an aircraft landing wheel structure wherein means, such as vanes or blades, are secured to or molded into the tires themselves so that a direct rotative action is applied to the tires by the wind as the aircraft lands.

In the drawing:

Figure 1 is a side elevation of an aircraft landing wheel structure according to a preferred embodiment of the invention.

Figure 2 is a front elevation of the landing wheel structure shown in Figure 1.

Figure 3 is a central vertical section along the irregular line 3—3 in Figure 1.

Figure 4 is a fragmentary cross section through one of the vanes or blades, taken along the line 4—4 in Figure 1.

Figure 5 is a fragmentary side elevation of a modification wherein the blades or vanes are secured or molded directly to the tire of the wheel.

General arrangement

In general, the aircraft landing wheel structure of this invention consists of means, such as blades or vanes, connected to the wheel or tire in such a manner as to be acted upon by the wind encountered as the aircraft flies through the air. The rotative action thus applied to the wheel or tire imparts a preliminary rotation thereto so that the wheel is rotating as it encounters the ground in landing.

Hitherto the tires of aircraft landing wheels have been subject to severe wear beyond the amount expected to be normally caused by the mere rolling of the wheel down the runway of the airport. This abnormal wear does not occur during taking off but only upon landing. It arises by reason of the fact that the wheel is substantially stationary when it encounters the ground or runway in landing, whereas it is moving relatively to the ground at a high rate of speed, such as up to 75 or more miles per hour. The sudden impact of a stationary wheel with the ground at such a high relative speed between the wheel and the ground causes the periphery of the tire to be dragged over the ground until the inertia of the landing wheel structure can be overcome and the wheel rotated until its peripheral speed is the same as the relative speed existing between the wheel and the ground.

Until this equality of relative speed is reached, however, the tire, in effect, is skidding along the ground with somewhat the same result as when the rotation of the wheels of an automobile is suddenly stopped by locking the brakes while the automobile is moving at a high rate of speed. In either case, the friction suddenly exerted between the tire and the ground wears off a considerable layer of the rubber and makes a long skid mark on the ground. In a like manner, the sudden impact of an airplane wheel with the airport runway during landing creates similar friction, similar wear, and a similar skid mark upon the runway.

This wear, moreover, is not only bad in itself, but also is dangerous because it makes the tire of uncertain value upon a subsequent landing.

A tire thus weakened at one portion of its periphery may suddenly blow out upon landing and cause the wing tip of the aircraft to scrape the ground. As a consequence, the aircraft whirls around in a circle and damage usually occurs. Moreover, the uneven wear thus brought about at the periphery of the tire throws the tires out of balance so that the wheel structure does not rotate evenly but on the contrary, gives uneven thrusts and sets up vibration in the landing gear.

An additional effect of landing the ordinary aircraft with stationary wheels is a tendency for the aircraft to "nose over" due to the sudden braking effect exerted at the front end of the aircraft by the friction between the wheel and the ground before the inertia of the wheel has been overcome, and the wheel rotated up to a sufficient peripheral speed. This "nosing over" effect is an action which must be counteracted by careful piloting of the aircraft during landing, and increases the skill necessary in the safe operating of aircraft.

The aircraft landing wheel structure of the present invention overcomes these defects of abnormal wear, friction, "nosing over" and danger of unexpected blowouts with fairly new tires by providing blades or vanes which are engaged by the wind as the aircraft descends in landing. The wind exerts a thrust upon these vanes and imparts a preliminary rotation to the landing wheels so that they are already rotating at a fairly rapid peripheral speed when the tires encounter the ground. Thus the difference in relative speed between the periphery of the tire and the ground is greatly reduced or eliminated altogether, and the skid marks and friction are also reduced or eliminated.

Furthermore, the preliminary rotation of the wheel in this manner eliminates the sudden braking effect upon impact with the ground and therefore also eliminates the tendency for the aircraft to "nose over" by reason of this action. A further beneficial effect resides in the cooling of the brake mechanism within the wheel by the air deflected from the blades or vanes, so that the vanes not only rotate the wheel but also assist in cooling the brake mechanism. The saving in the expense of tires thus becomes considerable when the present invention is employed, particularly in the use of heavy transport aircraft wherein the tires are very expensive. Moreover, the device of the present invention may be applied to the wheel either in place of the usual disk for holding the wheel on the axle or superimposed thereon. No special landing gear is therefore required, but the invention may be attached to existing landing gear.

The invention is of particular importance in connection with retractible landing gear because the wheels are then rotated only when they emerge from their compartments and cease rotation after they are returned to their compartments. It may, however, be used with light aircraft where the wheels can rotate continuously without detriment and where the air drag of the vanes or blades is not deemed of great importance.

The modification shown in Figure 5 provides vanes or blades which are molded to or otherwise secured to the tire itself, so that the rotative effect is caused by the impact of the wind directly with the tire vanes rather than with the vanes on the wheels. The size and proportions of the blades or vanes in either the principal form or the modification depend upon the particular size of the wheel.

*Rotating mechanism on wheel*

Referring to the drawing in detail, Figures 1 to 4 inclusive show a preferred embodiment of the invention wherein the rotating mechanism, such as the blades or vanes, is applied to the wheel itself rather than to the tire. The wheel, generally designated 10, is connected to a hub 11 by a disk-like web or spoke structure 12. The latter terminates at its periphery in a rim 13 having a removable edge ring 14 secured thereto as at 15. A disk 16 extends from the rim 13 toward the center of the wheel and is provided with apertures 17 for the passage of air therethrough. The web or disk structure 12 is likewise provided with apertures 18 for the passage of air into the space between it and the disk 16.

The wheel hub 11 is mounted upon the axle 19 as by the bearing assemblies 20 and 21 and held in position by the bolt 22. The axle 19 is provided with an extension 23 supported in the bore 24 within the support 25, the latter having a post or strut 26 extending upward to the aircraft and pivoted thereto in the usual way, in the case of a retractible landing gear. The details of the landing gear form no part of the present invention and may be varied as desired without departing from the spirit of the invention. The support 25 is provided with an annular skirt 27 surrounding the hub 11 and protecting it as well as serving as a support for brake mechanism 28. The latter is located in the space between the skirt 27 and the rim 13, and in Figure 3 is designated with the legend "Brake space." The brake mechanism 28 may likewise be of any suitable type, either a band brake or a disk brake or employing the interaction of fluids with rotors as desired.

Secured to the wheel 10 as by the screws 29 threaded into the holes 30 in the rim ring 14 is a disk 31 extending from the rim ring 14 inwardly to the center of the wheel. This disk 31 is preferably provided with apertures 32 corresponding in location to the apertures 18.

Superimposed upon the disk 31 is a second disk 33 having radial vanes or blades 34 disposed therearound. These vanes 34 are preferably in the form of louvres struck up from the surface of the disk 33 and leaving apertures 35 adjacent the apertures 32 in the disk 31.

Mounted on the rim 13 is the usual tire assembly. This includes the usual casing and one or more inner tubes. The particular details of this tire assembly 36 form no part of the principal embodiment of the invention.

*Operation*

During flight, the strut or post 26 is swung upwardly so that the wheel 10 and its tire assembly 36 are received in the usual compartment within the wings or fuselage of the aircraft. When the aircraft is about to land, the pilot lets down the landing gear, such as by the usual hydraulic motors, swinging the posts or struts 26 down into their approximately vertical positions.

As the wheels 10 emerge into the air from their compartments, the impact of the wind arising by reason of the high relative speed between the air and the aircraft engages the vanes or blades 34 and imparts a considerable thrust thereto. Since the vanes or blades 34 face the wind on only one side thereof, due to their louvre-like configuration, this force is applied to but one side of the wheel and the air rushes past the other side without exerting an equally great force. The force thus applied overcomes the inertia of the wheel and causes it to begin rotation. Its speed of rotation increases as the aircraft nears the ground so that when the tire 36 touches the ground, its peripheral speed approaches the relative speed existing between the aircraft and the ground.

As a consequence, there is little friction generated between the tire 36 and the ground at the instant of landing because the wheels 10 and tires 36 already are rotating at a rapid rate. For this reason, therefore, the skid marks and abnormal wear arising in ordinary use are greatly reduced and in many cases completely eliminated.

Due to the inclined angle of the blades or vanes 34, and to the presence of the approximately aligned apertures 32, 18 and 17, a portion of the air which engages the blades or vanes 34 is deflected into the interior of the wheel 10 and rushes through the brake space 28 by way of the apertures 32, 18 and 17. In this manner the brake space 28 is very efficiently cooled. The friction generated in the application of the brakes during landing is dissipated in the form of heat and this heat, by the present invention, is carried away by the air forced in as a result of the action of the blades or vanes 34. Thus the mechanism of the present invention has the double effect not only of imparting a preliminary rotation of the wheels but also of providing a cooling action for the brake mechanism.

Modified construction

In the modification shown in Figure 5, the tire 40 is provided with radial vanes or blades 41 molded directly in the side wall of the tire or otherwise secured directly to the tire. The action of the air upon the vanes or blades 41 rotates the tire, and with it the wheel to impart the preliminary rotation previously mentioned.

If desired, the wheel 42 employed with the tire 40 may be provided with apertures 43 adjacent the inner ends of the vanes or blades 41 so that a portion of the air deflected from the latter will be conducted into the interior of the wheel to cool the brake mechanism as in the principal embodiment of the invention.

While a specific embodiment of the invention has been described and illustrated, it will be understood that various modifications may be made within the scope of the appended claims without departing from the spirit of the invention.

What I claim is:

1. In an aircraft landing wheel structure, a wheel including a hub, a rim for receiving a tire, vane supporting structure extending between said hub and said rim and rotatable with said wheel, radially elongated vanes attached to said vane supporting structure and positioned to rotate said wheel in response to the force of air impinging thereon during flight, an enclosed brake chamber within said wheel, and brake mechanism disposed within said brake chamber for braking the same, said vane supporting structure having air inlet apertures adjacent said vanes and opening into said brake chamber for admitting a portion of the air deflected by said vanes and said brake chamber having air outlet apertures communicating with said air inlet apertures whereby to cool said brake mechanism.

2. In an aircraft landing wheel structure, an aircraft wheel including a rim for receiving a tire, vane supporting structure connected to said wheel and rotatable therewith, and vanes attached to said vane supporting structure and positioned to rotate said wheel in response to the force of air impinging thereon during flight, an enclosed brake chamber within said wheel, and brake mechanism disposed within said brake chamber for braking the same, said vanes being radially elongated, said vane supporting structure having air inlet apertures adjacent said vanes and opening into said brake chamber for admitting a portion of the air deflected by said vanes and said brake chamber having air outlet apertures on the opposite side thereof from said air inlet apertures whereby to cool said braking mechanism.

3. In an aircraft landing wheel structure, a wheel including a hub, a rim, a connecting structure extending between said hub and said rim, a cover member connected to said wheel for rotation therewith and disposed outside said connecting structure, vanes on said cover member and positioned to rotate said wheel in response to the force of air impinging thereon during flight, an enclosed brake chamber within said wheel, and brake mechanism disposed within said brake chamber surrounding said hub, said vanes being radially elongated, said connecting structure and said cover member having air inlet apertures opening into said brake chamber and positioned to conduct a portion of the air deflected from said vanes to said brake mechanism for cooling the same, said brake chamber having air outlet apertures remote from said air inlet apertures and communicating therewith for discharging the heated air produced by the cooling of said brake mechanism.

ANTHONY GULOTTA.